(12) United States Patent
Sugiyama et al.

(10) Patent No.: US 11,460,881 B2
(45) Date of Patent: Oct. 4, 2022

(54) ELECTRONIC DEVICE AND INFORMATION DEVICE SYSTEM

(71) Applicant: LENOVO (SINGAPORE) PTE. LTD., Singapore (SG)

(72) Inventors: Muneki Sugiyama, Yokohama (JP); Hiroaki Kinoshita, Yokohama (JP); Yoshiyuki Shibayama, Yokohama (JP); Tatsuya Ushioda, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 58 days.

(21) Appl. No.: 17/172,442

(22) Filed: Feb. 10, 2021

(65) Prior Publication Data

US 2022/0137664 A1 May 5, 2022

(30) Foreign Application Priority Data

Nov. 5, 2020 (JP) .............................. JP2020-185154

(51) Int. Cl.
*G06F 1/16* (2006.01)
*G06F 3/02* (2006.01)
*G06F 3/0354* (2013.01)

(52) U.S. Cl.
CPC .......... *G06F 1/1607* (2013.01); *G06F 1/1681* (2013.01); *G06F 3/0202* (2013.01); *G06F 3/03545* (2013.01)

(58) Field of Classification Search
CPC ........ G06F 1/16; G06F 1/1607; G06F 1/1681; G06F 1/1669; G06F 1/1662; G06F 3/0202; G06F 3/03545; G06F 2200/1632; F16M 11/04; F16M 11/041; F16M 11/06; A45C 2011/003
See application file for complete search history.

(56) References Cited

U.S. PATENT DOCUMENTS

| 5,743,414 | A  | * | 4/1998  | Baudino    | ............... | B43K 23/001 |
|-----------|----|---|---------|------------|----------------|-------------|
|           |    |   |         |            |                | 211/89.01   |
| 11,023,002 | B1 | * | 6/2021  | Manzano    | ............    | G06F 3/03545 |
| 2006/0244737 | A1 | * | 11/2006 | Dodge     | .................. | G06F 3/0393 |
|           |    |   |         |            |                | 345/179     |
| 2012/0188182 | A1 | * | 7/2012  | McKenna   | ............    | G06F 3/03545 |
|           |    |   |         |            |                | 345/173     |
| 2017/0063419 | A1 | * | 3/2017  | Griffin, II | ............    | H04B 1/3888 |
| 2017/0097698 | A1 | * | 4/2017  | Maeshima  | ..........     | G06F 3/03545 |
| 2021/0200339 | A1 | * | 7/2021  | Kanas     | .................. | G06F 3/03545 |
| 2021/0365065 | A1 | * | 11/2021 | Chuang    | .................. | G06F 1/1656 |

(Continued)

FOREIGN PATENT DOCUMENTS

JP          2018112835 A      7/2018

*Primary Examiner* — Adrian S Wilson
*Assistant Examiner* — Gage Crum
(74) *Attorney, Agent, or Firm* — Shimokaji IP

(57) ABSTRACT

An electronic device includes a chassis, an input device provided on a top surface of the chassis and configured to receive an input operation, and a pen holder provided so as to project from a side surface of the chassis and configured to be able to hold a pen device in a posture along the side surface. The pen holder has a pen holding part composed of stretchy fabric formed into a loop and configured to be able to hold the pen device by insertion of the pen device through its inner periphery part, and a bracket having a cutout part in which a part of the pen holding part is disposed and to be fixed to the chassis.

8 Claims, 12 Drawing Sheets

(56) References Cited

U.S. PATENT DOCUMENTS

| | | | |
|---|---|---|---|
| 2021/0373615 A1* | 12/2021 | Sung | G06F 1/1684 |
| 2022/0043479 A1* | 2/2022 | Moon | G06F 3/03545 |
| 2022/0083097 A1* | 3/2022 | Kanas | G06F 1/1607 |
| 2022/0147159 A1* | 5/2022 | Stancil | G06F 3/039 |

* cited by examiner

ELECTRONIC DEVICE AND INFORMATION DEVICE SYSTEM

FIELD OF THE INVENTION

The present invention relates to an electronic device including an input device, and an information device system.

BACKGROUND OF THE INVENTION

In recent years, portable information devices, such as a tablet PC and a smartphone having a touch panel type liquid crystal display and not having a physical keyboard, have rapidly spread. The display of this kind of portable information device has been desired to be large in use but has been desired to be miniaturized in carrying. Then, the present applicant has proposed a portable information device in which not only a chassis but also a display is configured so as to be foldable by the use of a flexible display, such as organic EL (Electro Luminescence) (for example, refer to Japanese Patent No. 6,507,183).

SUMMARY OF THE INVENTION

Even for the information device as described above, some users may want to input using an input device such as a physical keyboard. The input device as used in combination with the information device should preferably be formed into a thin plate shape and held between the first chassis and the second chassis when the information device is in a folded state so that portability can be achieved in an integrated manner.

On the other hand, in the above-described information device, a pen device is also used for touch panel operation. However, it is hard to secure a storage space for a pen device in a chassis that has been made smaller and thinner. Then, if the electronic device such as the keyboard described above and the pen device can be carried together, enhanced convenience can be obtained and a problem of the pen storage device can be solved. However, it is hard to secure the pen storage space because the electronic device such as a keyboard needs to be made even thinner than the main information device.

The present invention has been made in view of the above-described problem and has an object to provide an electronic device and an information device system that can hold a pen device though their chassis have been made thinner.

An electronic device according to the first aspect of the present invention includes a chassis, an input device provided on a top surface of the chassis and configured to receive an input operation, and a pen holder provided so as to project from a side surface of the chassis and configured to be able to hold a pen device in a posture along the side surface, in which the pen holder has a pen holding part composed of stretchy fabric formed into a loop and configured to be able to hold the pen device by insertion of the pen device through its inner periphery part, a bracket having a cutout part in which a part of the pen holding part is disposed and to be fixed to the chassis, and a rod-like member configured to connect the pen holding part to the bracket by being inserted through the inner periphery part of the pen holding part disposed in the cutout part and fixed to the bracket in a state of crossing the cutout part in a wide direction.

An information device system according to the second aspect of the present invention includes a main device to which a first chassis and a second chassis are adjacent to one another and are relatively rotatably connected, and a plate-shaped sub-device to be used in combination with the main device, in which the sub-device has a chassis, an input device provided on a top surface of the chassis and configured to receive an input operation, and a pen holder provided so as to project from a side surface of the chassis and configured to be able to hold a pen device in a posture along the side surface, the pen holder has a pen holding part composed of stretchy fabric formed into a loop and configured to be able to hold the pen device by insertion of the pen device through its inner periphery part, a bracket having a cutout part in which a part of the pen holding part is disposed and to be fixed to the chassis, and a rod-like member configured to connect the pen holding part to the bracket by being inserted through the inner periphery part of the pen holding part disposed in the cutout part and fixed to the bracket in a state of crossing the cutout part in a wide direction, in a case of a stacked form in which the first chassis and the second chassis of the main device are disposed so as to overlap with each other in their plane directions, the sub-device is able to be disposed at a storage position where it is held between the first chassis and the second chassis, and at the storage position, the pen holding part is disposed so as to project from side surfaces of the first chassis and the second chassis, and the pen device held by the pen holding part is contained within a stacking height of the first chassis and the second chassis.

According to the above-described aspects of the present invention, it is possible to hold a pen device even in the chassis made thinner.

DETAILED DESCRIPTION OF THE INVENTION

Hereinafter, a preferred embodiment of an electronic device and an information device system according to the present invention is described in detail with reference to the attached drawings.

The information device system 10 (refer to FIG. 3) of the present embodiment includes a portable information device 11 as a main device and an electronic device 13 as a sub-device. The electronic device 13 of the present embodiment includes a keyboard 24 that functions as an input device for the portable information device 11.

Figure 1:
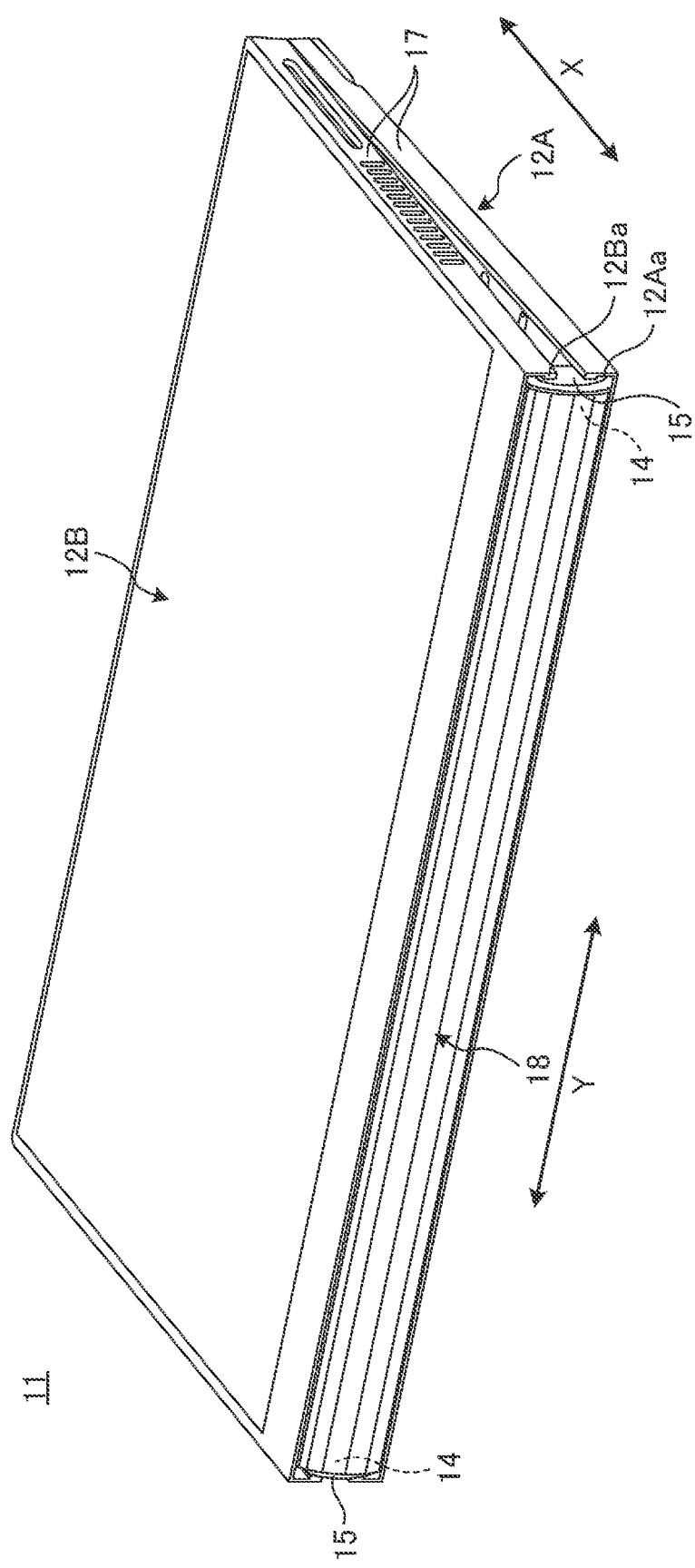
FIG. 1 is a perspective view illustrating a state where a portable information device is closed into a storage form.
Figure 2:
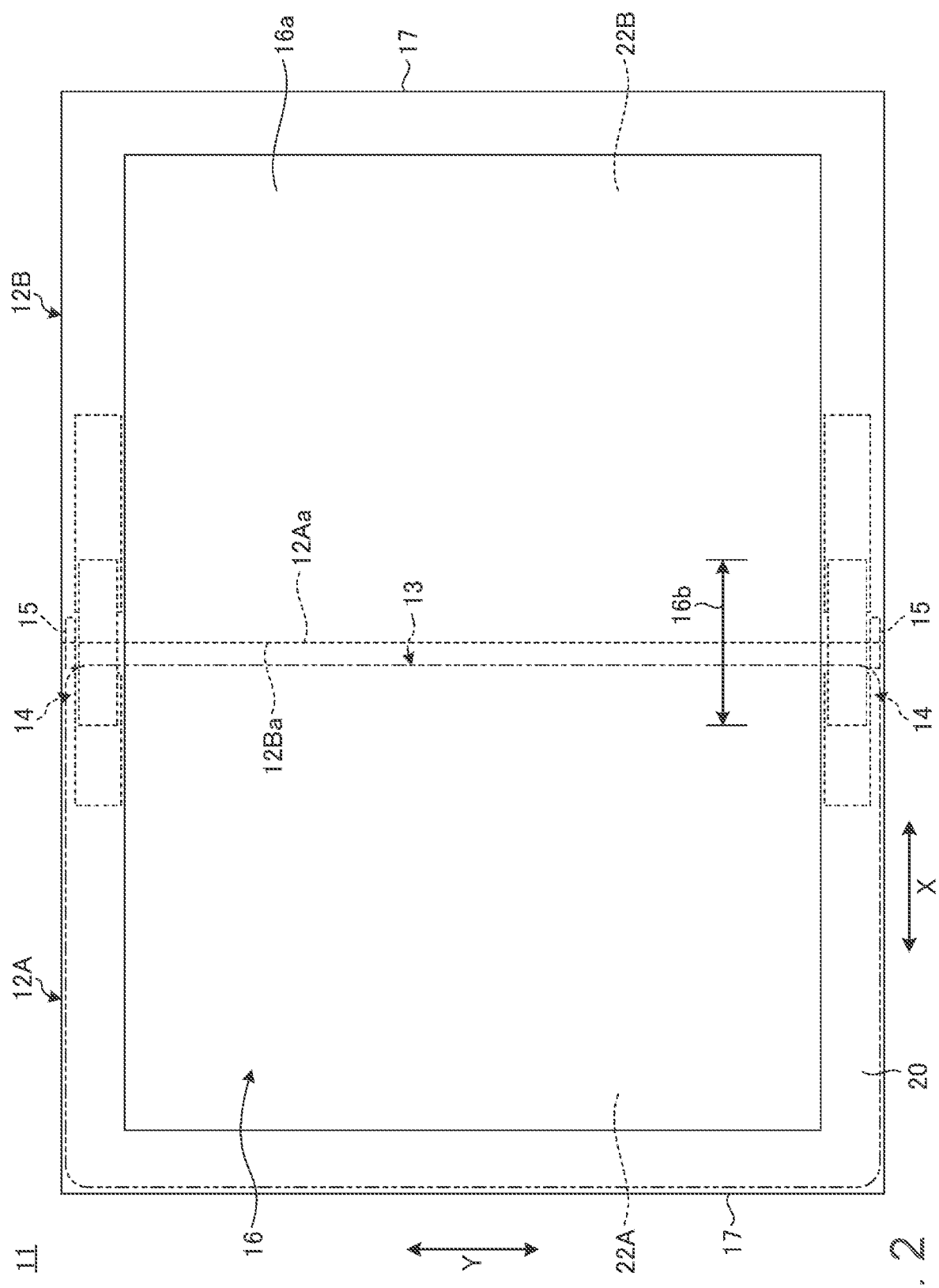
FIG. 2 is a perspective view schematically illustrating a state where the portable information device illustrated in FIG. 1 is opened into a usage form.

First, a configuration of the portable information device 11 is described. FIG. 1 is a perspective view of the portable information device 11 in a state of being closed into a storage form. FIG. 2 is a plan view schematically illustrating a state where the portable information device 11 illustrated in FIG. 1 is opened into a usage form.

As illustrated in FIG. 1 and FIG. 2, the portable information device 11 includes a first chassis 12A, a second chassis 12B, a hinge device 14, a cover member 15, and a display 16. The portable information device 11 of the present embodiment is a tablet PC foldable like a book. The portable information device 11 may be a cellular phone, a smartphone, an electronic notebook, or a portable game console, etc.

The chassis 12A and 12B are each a rectangular flat box body, a side plate 17 is formed to be raised on four peripheries of their bottom plate, and the display 16 is disposed on an opened top surface. The chassis 12A and 12B are each composed of metal plates of stainless steel, magnesium, and aluminum etc., fiber reinforced resin plates containing reinforced fibers, such as carbon fibers, or the like, for example.

The chassis 12A and 12B are disposed adjacent to each other. The chassis 12A and 12B are connected through a pair of the hinge devices 14 and 14 provided in both end portions in the Y direction of one edge portions 12Aa and 12Ba as edge portions adjacent to each other. The hinge devices 14 rotatably connect the one edge portions 12Aa and 12Ba of the first chassis 12A and the second chassis 12B so that the second chassis 12B is opened and closed with respect to the first chassis 12A. The chassis 12A and 12B are rotatably connected by the hinge devices 14. The chassis 12A and 12B can be moved to a desired angular position between the storage form illustrated in FIG. 1 and the usage form illustrated in FIG. 2. In the storage form illustrated in FIG. 1, the one edge portions 12Aa and 12Ba of the chassis 12A and 12B are greatly separated from each other. Then, a boundary portion between the one edge portions 12Aa and 12Ba is covered by a backbone member 18. It is to be noted that the storage form of the portable information device 11 includes a below-mentioned form in which the electronic device 13 is held between the two chassis 12A and 12B (refer to FIG. 4). In addition, the electronic device 13 placed at a specified usage position is shown in FIG. 2 by a virtual line.

Hereinafter, as illustrated in FIG. 1 and FIG. 2, the portable information device 11 is described designating a direction in which the chassis 12A and 12B are arranged as an X direction and a longitudinal direction of the backbone member 18 perpendicular to the X direction as a Y direction. In addition, the electronic device 13 is described using the same X and Y directions as the portable information device 11, based on a state being placed on the portable information device 11 (refer to FIG. 3).

The display 16 is a touch panel type liquid crystal display, for example. The display 16 is a flexible display, such as an organic EL having a paper structure with high flexibility, for example. The display 16 seamlessly covers display surfaces of the first chassis 12A and the second chassis 12B and is opened/closed with an opening/closing operation of the chassis 12A and 12B. A bezel member 20 is disposed on an outer peripheral edge portion of the surface (display surface) 16a of the display 16 (refer to FIG. 2). The bezel member 20 is a frame-shaped sheet-like member having flexibility. The bezel member 20 covers a non-displaying region (inactive region) of the outer peripheral edge portion excluding a display region (active region) of the surface 16a of the display 16.

The display 16 is provided over the chassis 12A and 12B. The display 16 is supported by the chassis 12A and 12B through left and right support plates 22A and 22B fixed to the chassis 12A and 12B, respectively. The display 16 is fixed to top surfaces of the left and right support plates 22A and 22B using a double-sided tape, or the like. A belt-like region of the display 16 overlapping with the hinge devices 14 is not fixed to the left and right support plates 22A and 22B and serves as a bendable bending region 16b (refer to FIG. 2).

The chassis 12A and 12B contain a substrate mounted with various types of semiconductor chips, a battery device, an antenna device, as well as various types of electronic components, and a cooling device etc., for example.

The cover member 15 is a cap-shaped member that is attached to each hinge device 14 and covers a lateral surface of the hinge device 14. In the storage form, a tip surface of the cover member 15 is at a position where it projects to an inner side (right side in FIG. 4) in the bending direction of the display 16 than the surface 16a of the bending region 16b formed in a circular arc shape, of the display 16. Thus, the cover member 15 functions as a guard member that prevents the electronic device 13 held between the chassis 12A and 12B from colliding against the surface 16a of the bending region 16b, in the storage form.

Figure 3:
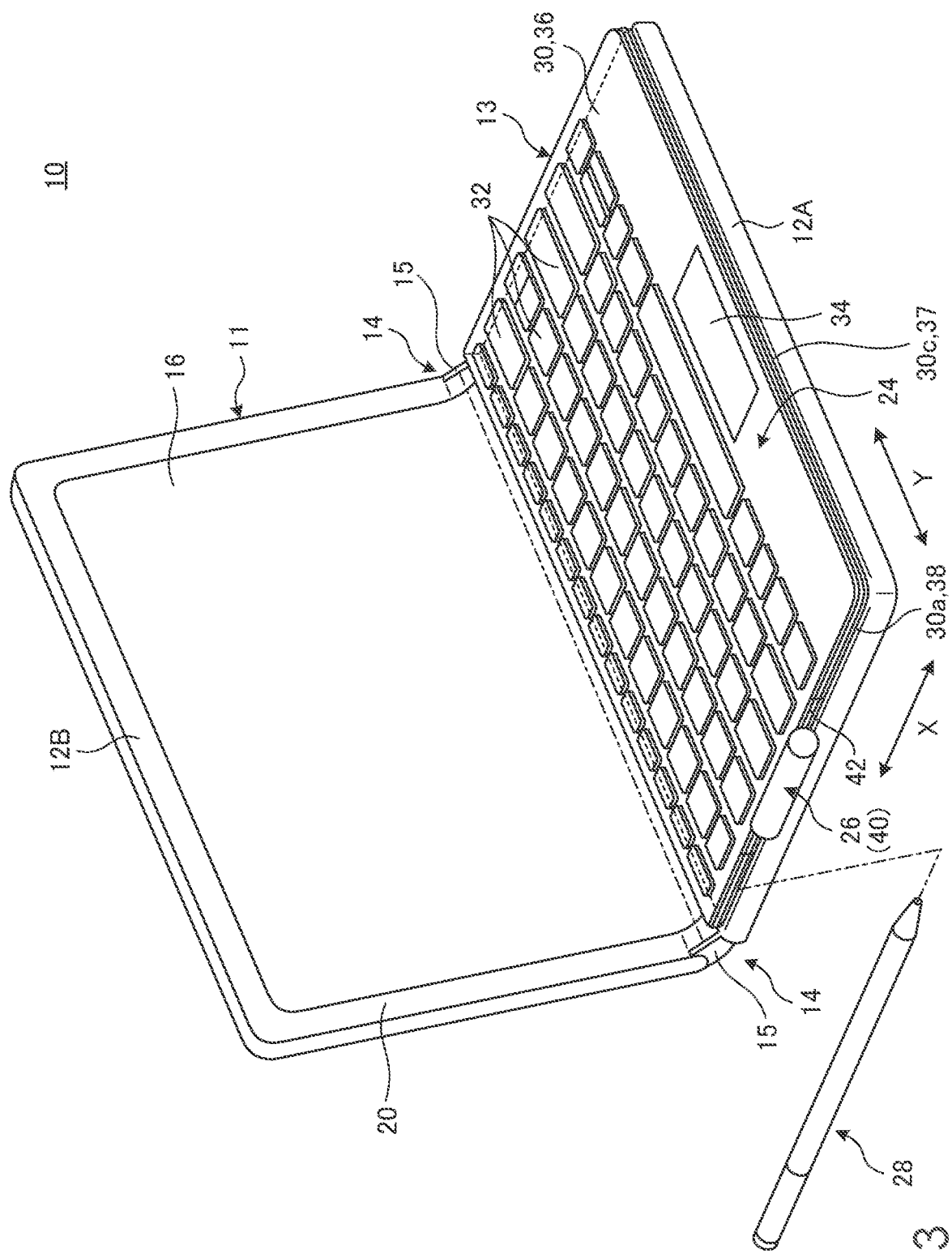
FIG. 3 is a perspective view of an information device system 10.

Next, described is the electronic device 13 that is used in combination with the portable information device 11. FIG. 3 is a perspective view of the information device system 10. As described above, the information device system 10 includes the portable information device 11 as a main device and the electronic device 13 as a sub-device. The electronic device 13 includes a chassis 30, the keyboard 24 provided on a top surface 30b of the chassis 30, and a pen holder 26 attached to a side surface 30a of the chassis 30. The keyboard 24 is an input device for the portable information device 11. The pen holder 26 is intended for holding a pen device 28 used for a touch operation on the display 16. In FIG. 3, the electronic device 13 is placed at a usage position specified by a top surface of the first chassis 12A. This state is referred to as a placement state of the electronic device 13.

First, the keyboard 24 is described. When the keyboard 24 is in the placement state on the top surface of the first chassis 12A, it is of substantially the same shape as the first chassis 12A in plan view (refer to FIG. 2). The keyboard 24 is positioned at the usage position with respect to the first chassis 12A by a magnet, for example. The magnet is provided in, for example, both the keyboard 24 and the first chassis 12A, and they are attracted to each other by opposite magnetic poles.

When the keyboard 24 is in the placement state, wireless communication and wireless charging between the keyboard 24 and the portable information device 11 are performed. Therefore, the keyboard 24 in the placement state is fixed in place, and it becomes possible to input keys and charge without any particular electrical connection operation. The keyboard 24 is fixed by the positioning magnet with moderate magnetic force and thus is easily manually removed. It is to be noted that even if the keyboard 24 is disposed at a position different from the placement state, it can wirelessly communicate with the portable information device 11 as long as it is within a predetermined distance.

Figure 4:
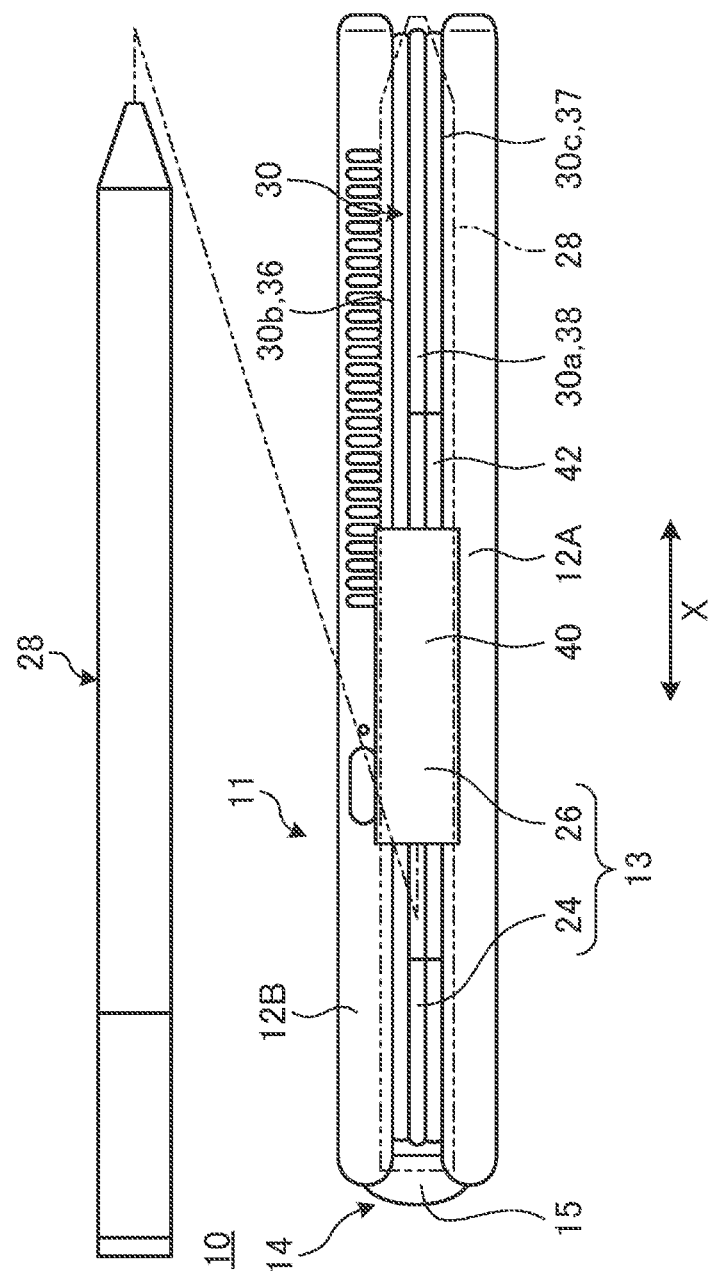
FIG. 4 is a side view illustrating the portable information device in the storage form and an electronic device held between a first chassis and a second chassis.

FIG. 4 is a side view illustrating the portable information device 11 in the storage form and the electronic device 13 held between the first chassis 12A and the second chassis 12B. As illustrated in FIG. 4, when the portable information device 11 is folded by the rotation of the first chassis 12A and second chassis 12B while the electronic device 13 is kept in the placement state on the top surface of the first chassis 12A, the electronic device 13 can be held between the first chassis 12A and the second chassis 12B. With this, the electronic device 13 can obtain preferable portability integrated with the portable information device 11. At this time, the keyboard 24 never protrudes from the first chassis 12A and the second chassis 12B and thus the information device system 10 is maintained compact. In addition, since the keyboard 24 is held between the first chassis 12A and the second chassis 12B, they are parallel in the X direction and orderly in appearance, and thus are preferable in design.

Figure 5:
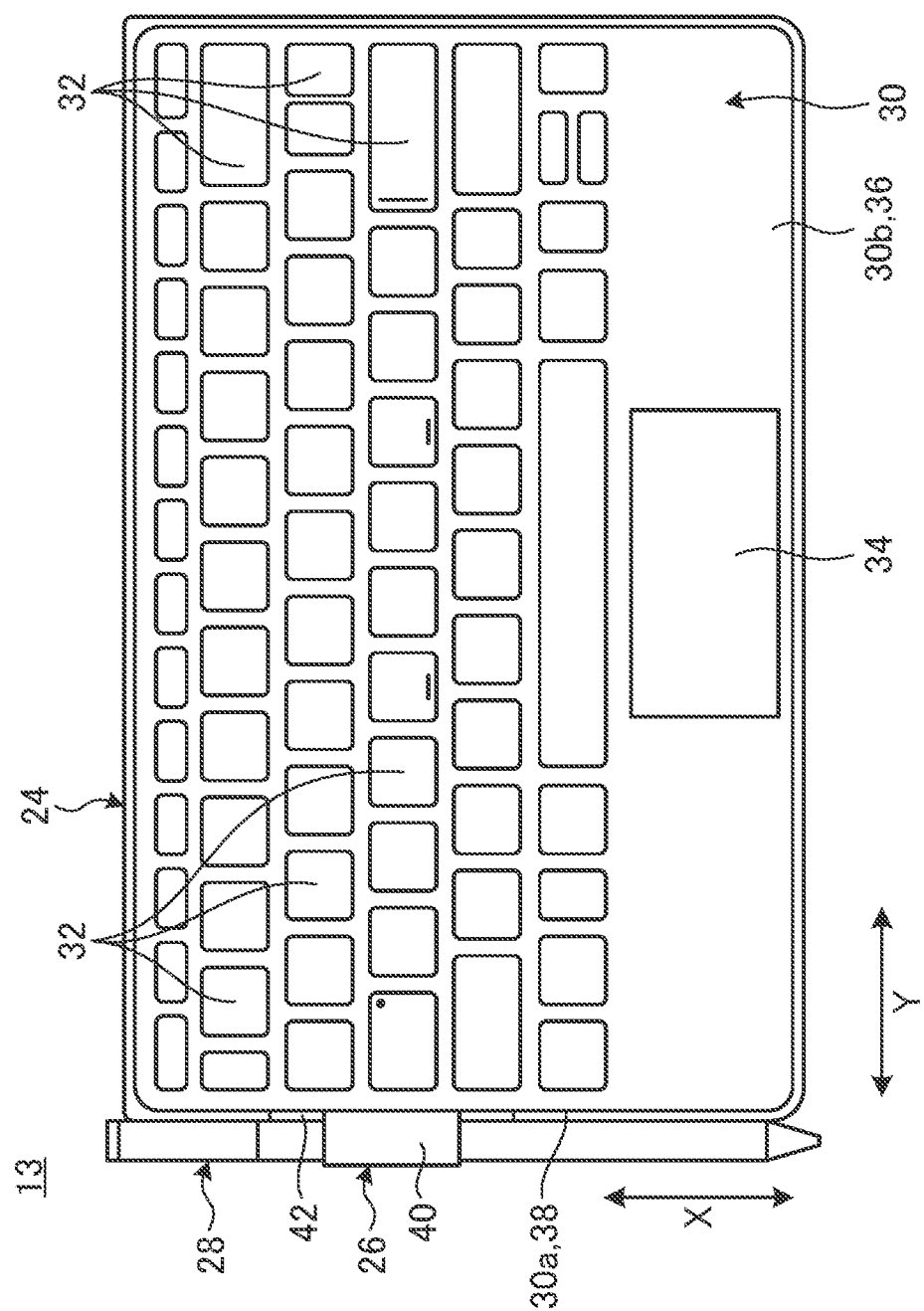
FIG. 5 is a plan view of the electronic device.

FIG. 5 is a plan view of the electronic device 13. As illustrated in FIG. 3 to FIG. 5, the chassis 30 is of a thin plate shape. The keyboard 24 includes a plurality of keys 32 provided on the top surface 30b of the chassis 30, and a touchpad 34 provided on the front side of the top surface 30b.

The chassis 30 has a top cover 36 forming the top surface 30b, a bottom cover 37 forming a bottom surface 30c, and a frame 38 forming the side surface 30a. The top cover 36 is a plate-like member in which a plurality of hole parts for insertion of each key 32 is formed, and is an isolation frame that isolates each key 32 (refer to FIG. 7A). The bottom cover 37 is a plate-like member. The covers 36 and 37 are formed of a resin material or magnesium alloy material, for example. The frame 38 is a rectangular frame body that forms the surrounding side surface 30a of the chassis 30 (also refer to FIG. 7A to FIG. 8). The frame 38 is a support body for the covers 36 and 37, and the covers 36 and 37 are connected to each other through the frame 38. The frame 38 is formed of a resin elastic material such as rubber or silicon rubber, and slightly projects outside from outer peripheral edge portions of the covers 36 and 37. Thus, the frame 38 also functions as a bumper (impact absorbing part) of the chassis 30.

Next, the pen holder 26 is described. As illustrated in FIG. 3 to FIG. 5, the pen holder 26 of the present embodiment is provided so as to project from the left side surface 30a of the chassis 30. Thus, the pen holder 26 and the pen device 28 held by the pen holder 26 protrude from the chassis 12A and 12B when the electronic device 13 is in the placement state. However, the pen holder 26 and the pen device 28 are contained within a plate thickness of the chassis 12A and 12B (refer to FIG. 4), and are also disposed along the side surfaces of the chassis 12A and 12B (refer to FIG. 3 and FIG. 5). Thus, the pen holder 26 and the pen device 28 are apparently integrated with the side surfaces of the chassis 12A and 12B, and the pen holder 26 and the pen device 28 almost never get in the way when the information device system 10 is carried, for example. The pen holder 26 may be provided on the right side surface 30a or the front-side (touchpad 34 side) side surface 30a.

Figure 6A:
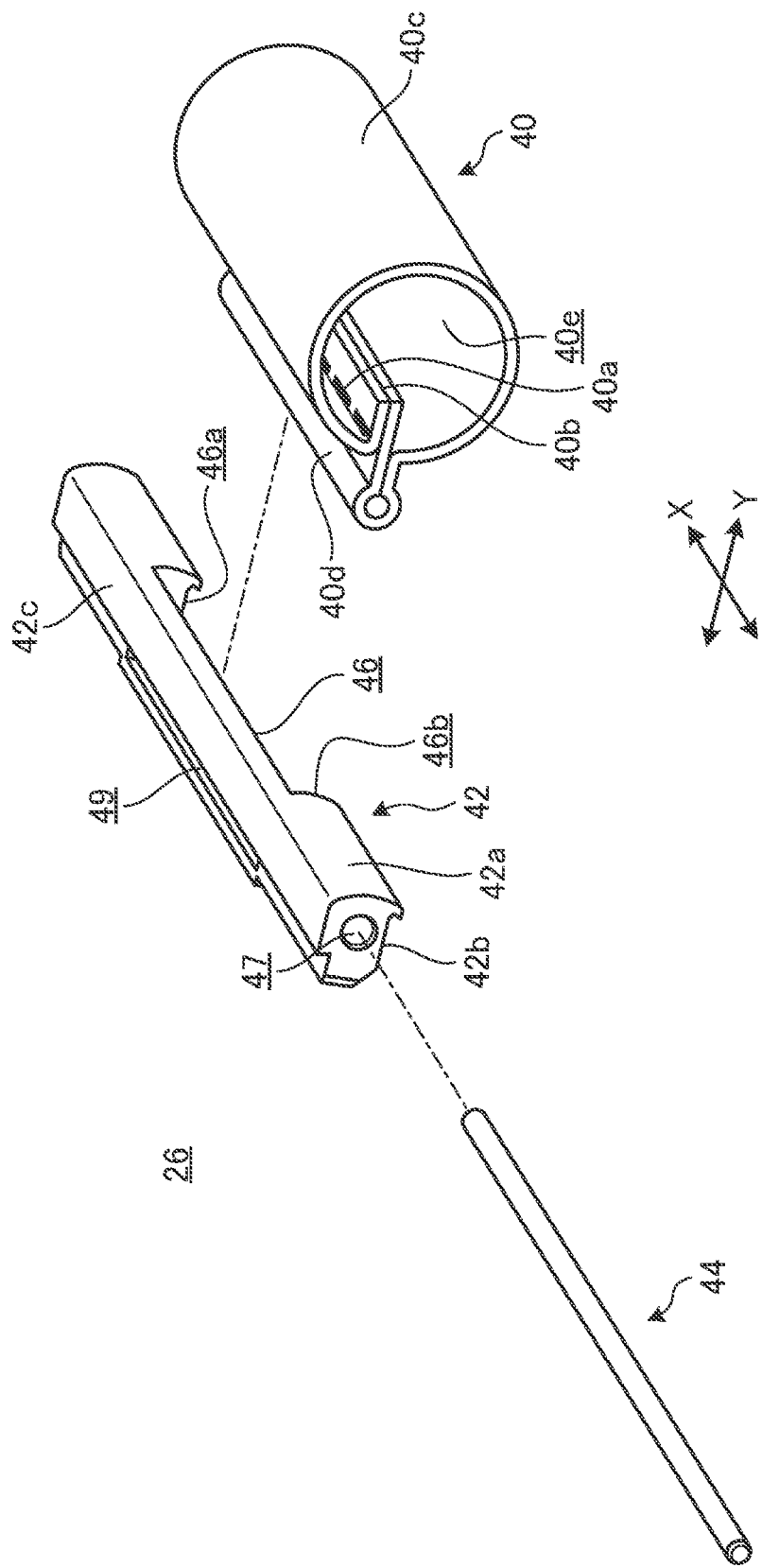
FIG. 6A is an exploded perspective view of a pen holder.
Figure 6B:
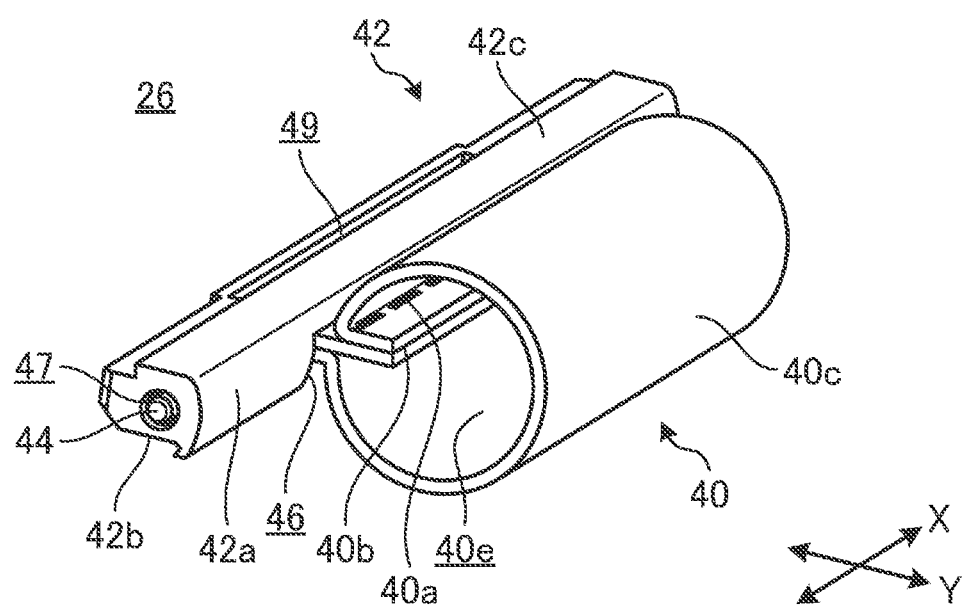
FIG. 6B is a perspective view of the pen holder.

FIG. 6A is an exploded perspective view of the pen holder 26. FIG. 6B is a perspective view of the pen holder 26. FIG. 6A and FIG. 6B illustrate a state as viewed from the bottom surface 30c side of the chassis 30, based on a state where the pen holder 26 is attached to the chassis 30.

As illustrated in FIG. 6A, the pen holder 26 has a pen holding part 40, a bracket 42, and a rod-like member 44.

The pen holding part 40 is a looped component for holding the pen device 28. The pen holding part 40 is composed of stretchy fabric formed into a loop and has a tubular shape. The stretchy fabric is a material (fabric or woven cloth) having elasticity or stretchability, for example, and is a material that is also referred to as elastic fabric or stretch fabric, for example. The pen holding part 40 has a structure in which both ends of a piece of fabric are stitched together at a stitched seam 40a to be formed into a loop and this looped fabric is turned inside out to hide the stitched seam 40a and a pleat (plait) 40b formed in front of the stitched seam 40a on an inner periphery side. A width of the pen holding part 40 in the X direction is 29 mm, for example.

The pen holding part 40 forms one large loop as a whole. The pen holding part 40 is connected to the bracket 42 using the rod-like member 44 to be apparently formed into a shape in which two loops (a large loop 40c and a small loop 40d) are connected in an eye glasses-like manner. The pen device 28 is inserted into and held in the large loop 40c in an inner periphery part 40e of the pen holding part 40, and the rod-like member 44 is inserted through the small loop 40d. The stitched seam 40a is formed along an axial direction of the inner periphery part 40e. Although FIG. 6A and FIG. 6B illustrate a state where the pen holding part 40 forms the loops 40c and 40d, the pen holding part 40 is in a state where the large loop 40c is collapsed when the pen device 28 is not inserted through it (refer to FIG. 9A).

The bracket 42 is a component for attaching the pen holding part 40 to the chassis 30 of the keyboard 24. The bracket 42 is a bar-like member that is formed of a resin material or a metallic material and has a rectangular cross section. The bracket 42 is provided with a cutout part 46 and a fitting hole 47.

The cutout part 46 consists of a top surface opening 46a and a side surface opening 46b that is continued from the top surface opening 46a. The top surface opening 46a is opened on a top surface 42b of the bracket 42. The side surface opening 46b is opened on a side surface 42a of the bracket 42. The cutout part 46 is formed substantially in the central part in a longitudinal direction (X direction) of the bracket 42, and has an X-directional length (opening width) that is about half the entire length of the bracket 42. In the present embodiment, the entire length (X-directional length) of the bracket 42 is 57 mm and an X-directional width of the cutout part 46 is 30 mm, for example.

The fitting hole 47 is a small diameter hole part that penetrates substantially the center of a cross section of the bracket 42 over the entire length in the longitudinal direction. The fitting hole 47 is formed so as to pass through the cutout part 46 on the way. That is, a pair of the fitting holes 47 is formed so as to cross the cutout part 46.

Figure 7A:
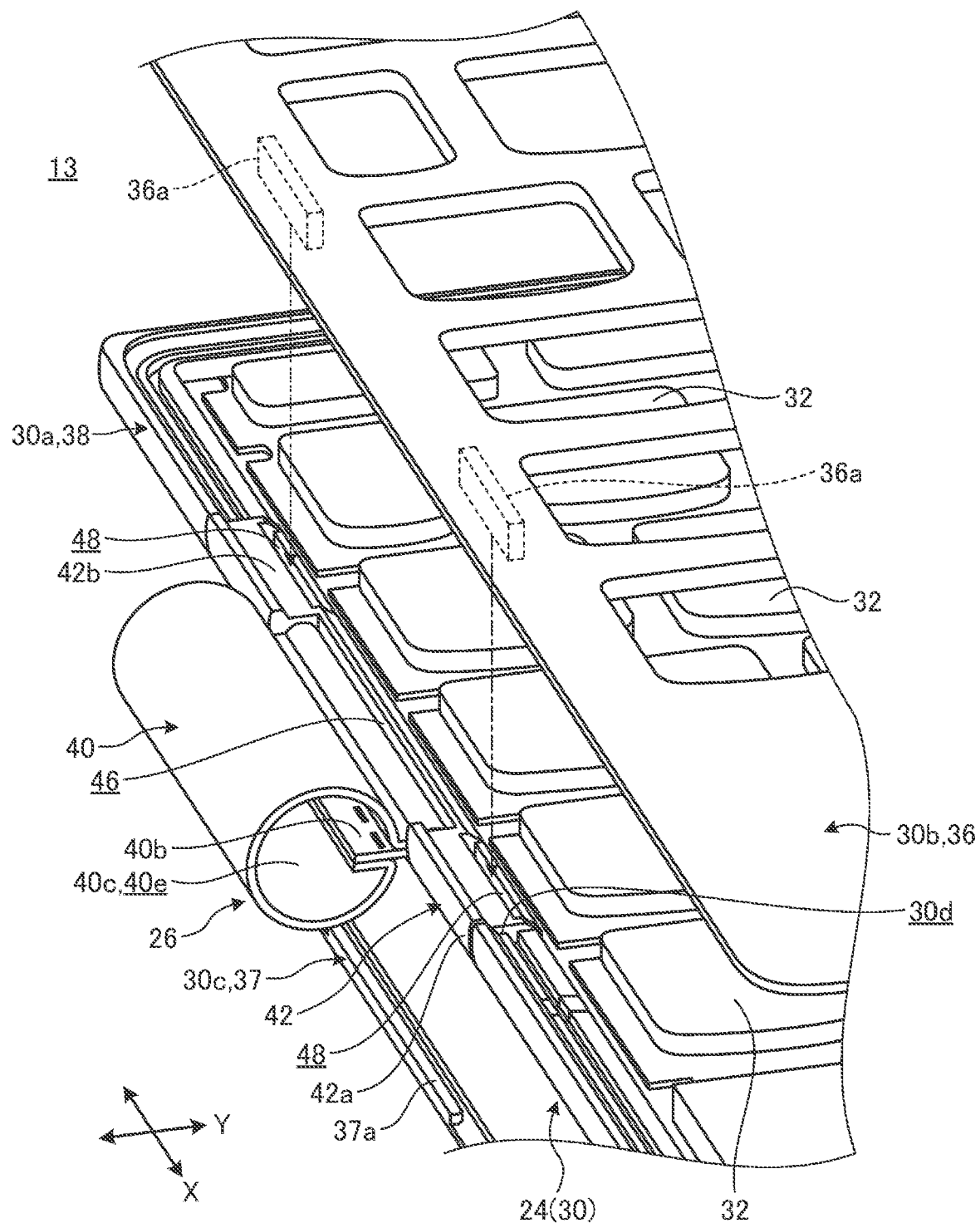
FIG. 7A is a main-part-enlarged exploded perspective view describing an operation of attaching the pen holder to a chassis.

In the top surface 42b of the bracket 42, a pair of top engaging holes 48 and 48 arranged in the X direction is formed (refer to FIG. 7A). The top engaging holes 48 are located near an end part on the side opposite to the side surface 42a in the Y direction. The top engaging hole 48 is a long hole that extends in the X direction and has a rectangular shape in plan view. A sunken portion is formed in the bottom surface 42c of the bracket 42, and a bottom engaging hole 49 is formed in this sunken portion (refer to FIG. 6A). The bottom engaging hole 49 is located near the end part on the side opposite to the side surface 42a in the Y direction. The bottom engaging hole 49 is a long hole that extends in the X direction and has a rectangular shape in plan view.

The rod-like member 44 is a small diameter metallic rod made of stainless steel, or a resin rod made of hard resin, for example. The entire length of the rod-like member 44 is substantially equal to or a little less than the entire length of the bracket 42 in the X direction. In the present embodiment, the entire length of the rod-like member 44 is 57 mm. An external diameter of the rod-like member 44 is substantially equal to an internal diameter of the fitting hole 47 of the bracket 42, and thus the rod-like member 44 can be pressed and fixed into the fitting hole 47.

As illustrated in FIG. 6A and FIG. 6B, in an assembly process of the pen holder 26, first, a part of the pen holding part 40 is inserted into the cutout part 46 of the bracket 42 through the side surface opening 46b. Next, the rod-like member 44 is fitted into the fitting hole 47. The rod-like member 44 is inserted through the inner periphery part 40e of the pen holding part 40 disposed in the cutout part 46 when it passes through the cutout part 46. That is, the rod-like member 44 crosses the cutout part 46 in a width direction (X direction) and is fixed to the bracket 42 in a state where the pen holding part 40 is hung on it. At this time, the small loop 40d of the pen holding part 40 is formed around the rod-like member 44.

Thus, the pen holding part 40 is connected to the bracket 42 using the rod-like member 44 to form the pen holder 26. At this time, both end portions of the rod-like member 44 crossing the cutout part 46 are retained in the fitting hole 47 with a sufficient length. Thus, the pen holder 26 can obtain a high strength that can prevent the rod-like member 44 from deforming to fall off from the fitting hole 47 even when the pen holding part 40 is subject to a strong pulling force.

Figure 7B:
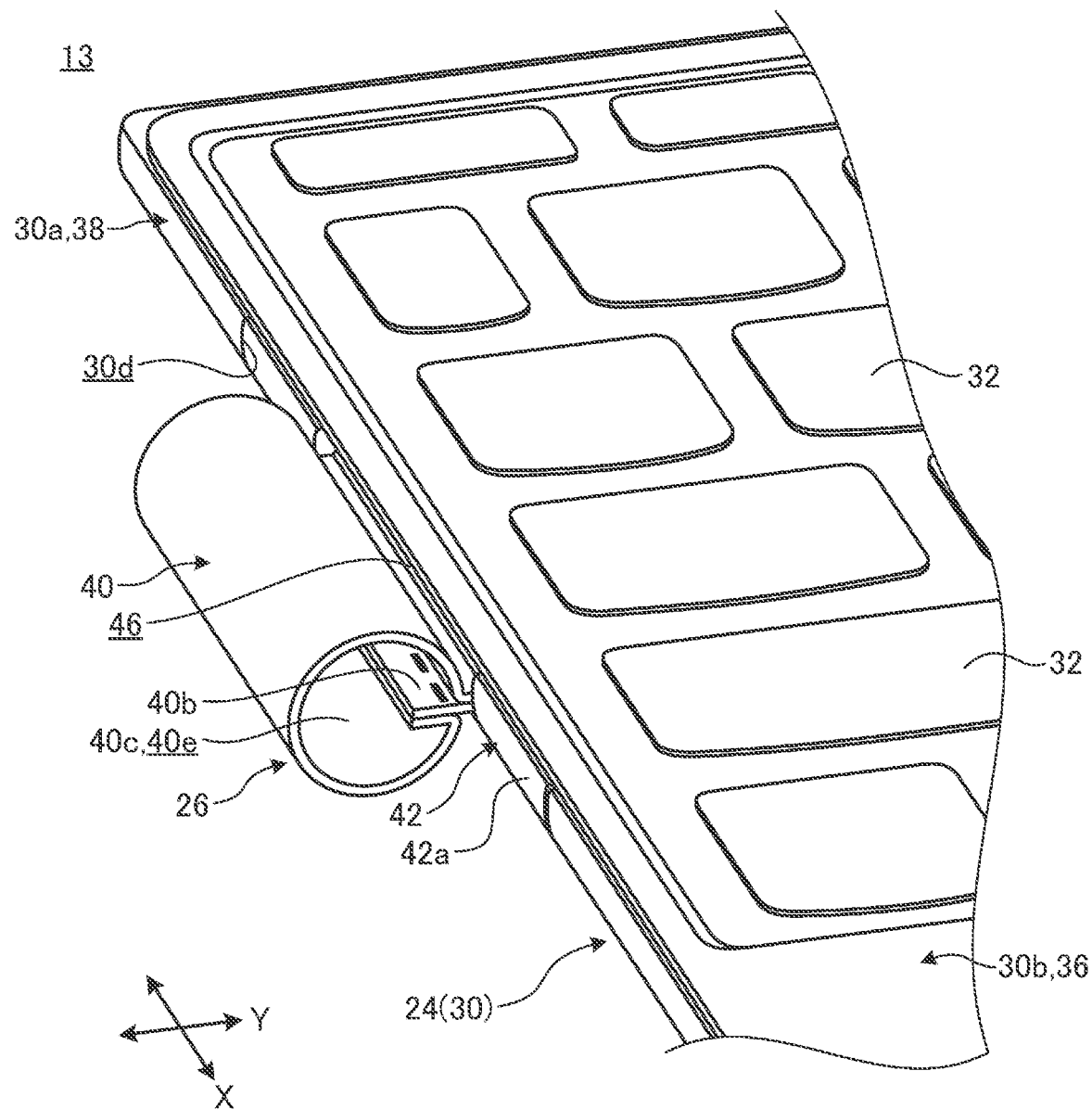
FIG. 7B is a main-part-enlarged perspective view illustrating a state where the pen holder illustrated in FIG. 7A is attached to the chassis.
Figure 8:
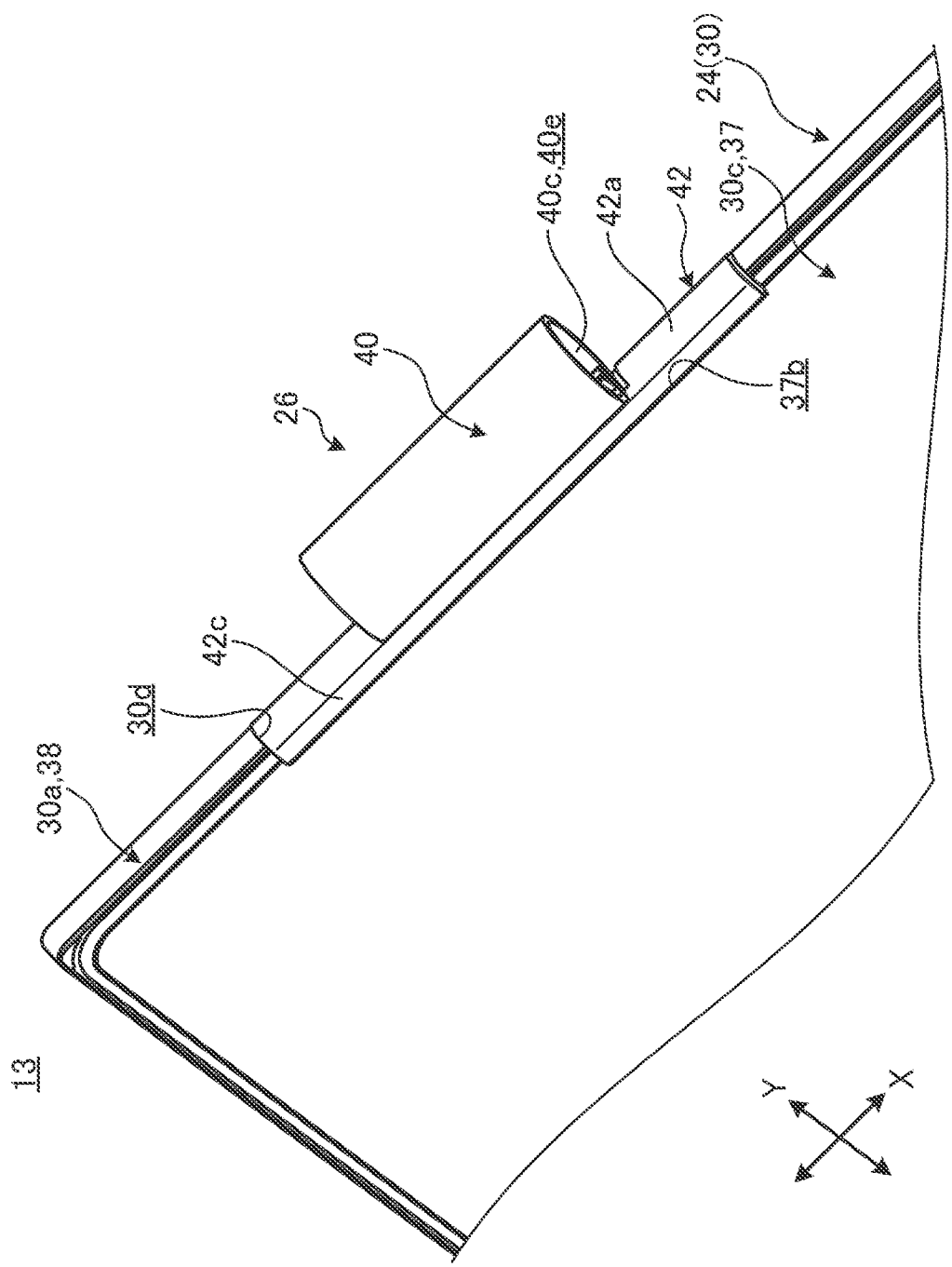
FIG. 8 is a perspective view of the pen holder and the chassis illustrated in 7B as viewed from a bottom surface side.
Figure 9A:
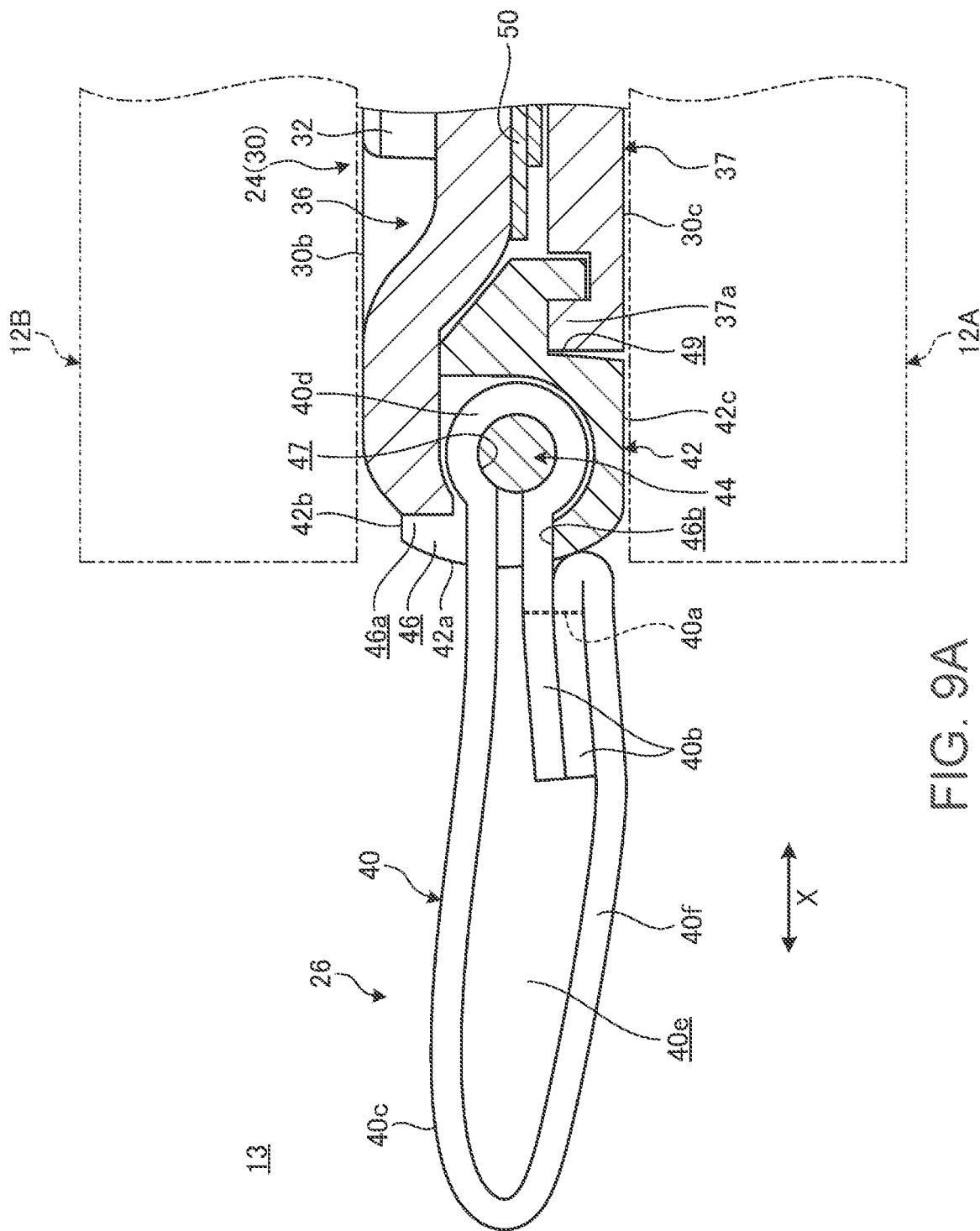
FIG. 9A is a front cross-sectional view of the pen holder and the chassis illustrated in FIG. 7B.

Next, described is a structure of attaching the pen holder 26 to the chassis 30 of the keyboard 24. FIG. 7A is a main-part-enlarged exploded perspective view describing an operation of attaching the pen holder 26 to the chassis 30. FIG. 7B is a main-part-enlarged perspective view illustrating a state where the pen holder 26 illustrated in FIG. 7A is attached to the chassis 30. FIG. 7A and FIG. 7B are views of the pen holder 26 and the chassis 30 as viewed from the top surface 30b side. FIG. 8 is a perspective view of the pen holder 26 and the chassis 30 illustrated in 7B as viewed from the bottom surface 30c side. FIG. 9A is a front cross-sectional view of the pen holder 26 and the chassis 30 illustrated in FIG. 7B. In FIG. 9A, the cross-sectional hatching for the pen holding part 40 is omitted, and the same holds for FIG. 9B.

As illustrated in FIG. 7A and FIG. 9A, the keyboard 24 of the present embodiment has a structure in which almost all of components including the keys 32, a base plate 50, a membrane sheet, and even the touchpad 34 etc., are supported by the top cover 36. Then, the frame 38 and the bracket 42 are attached to the top cover 36 with screws or adhesive etc. (refer to FIG. 7A).

At this time, the top surface opening 46a of the cutout part 46 of the bracket 42 is covered by the top cover 36 (refer to FIG. 5 and FIG. 7B). The bracket 42 is fixed to the top cover 36 with adhesive etc. Further, the bracket 42 is positioned by engagement of each top engaging piece 36a projecting from an inner surface of the top cover 36 with each top engaging hole 48 and thus rattling can also be prevented (refer to FIG. 7A).

The chassis 30 has a cut-away part 30d formed by cutting away a part of the side surface 30a (frame 38). The cut-away part 30d has an X-directional length that is substantially equal to the entire length of the bracket 42 and thus the bracket 42 can be fitted into the cut-away part 30d without gaps. Thus, the bracket 42 complements a part of the frame 38 and its side surface 42a constitutes a part of the side surface 30a of the chassis 30 (refer to FIG. 7B and FIG. 8).

It is to be noted that the side surface opening 46b of the cutout part 46 is mostly filled with the fabric of the pen holding part 40.

Next, as illustrated in FIG. 7A and FIG. 8, the bottom cover 37 is fixed to the frame 38 with screws or adhesive etc. At this time, the bracket 42 is fixed to the bottom cover 37 with adhesive etc. Further, the bracket 42 is positioned by engagement of a bottom engaging piece 37a projecting from an inner surface of the bottom cover 37 with the bottom engaging hole 49 and thus rattling can also be prevented (refer to FIG. 9A). The bottom surface 42c of the bracket 42 is fitted to a notch-shaped recessed portion 37b formed at an edge part of the bottom cover 37 and constitutes a part of the bottom surface of the frame 38 and a part of the bottom surface 30c of the bottom cover 37 (refer to FIG. 8).

In this manner, the bracket 42 on the top surface 30b side, which is conspicuous on appearance, of the electronic device 13 is hidden by the top cover 36, while on the bottom surface 30c side, which is inconspicuous on appearance, its bottom surface 42c constitutes a part of the bottom cover 37. Thus, the bracket 42 can be easily attached to even the chassis 30 that has a very thin plate thickness (for example, about 4.2 mm) and in which it is hard to secure an installation space in the vertical direction, and the degradation of the quality of appearance of the chassis 30 can also be prevented. In addition, as illustrated in FIG. 5 and FIG. 7B, a width of a bezel portion between the side surface 30a and adjacent keys 32 of the chassis 30 is narrow (for example, a width in the Y direction is 5.3 mm). However, since the side surface 42a constitutes a part of the side surface 30a of the chassis 30, the bracket 42 can be attached to even the chassis 30 having a narrow bezel in which it is hard to secure an installation space in a depth direction.

Based on the above, the bracket 42 is connected to the chassis 30 in a state of being held between the covers 36 and 37 of the keyboard 24 and forms a mounting structure in which the pen holding part 40 projects from the side surface 30a (refer to FIG. 9A). It is to be noted that since the pen holding part 40 is formed of soft fabric, it is collapsed to be thinner when the pen device 28 is not inserted into it (refer to FIG. 9A). As a result, the pen holding part 40 does not project above the top surface 30b of the keyboard 24 and thus, never gets in the way in the input operation of the keys 32.

Figure 9B:
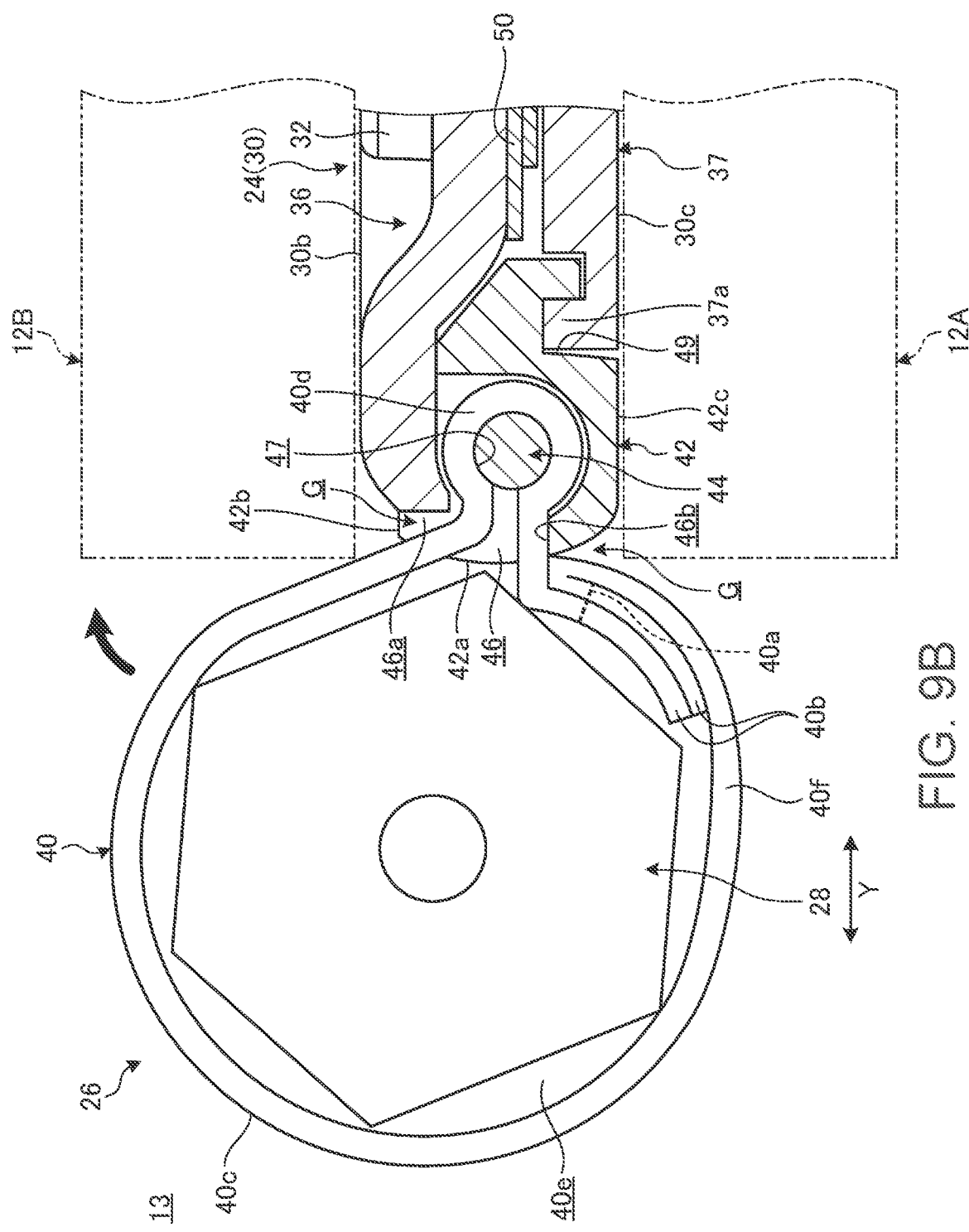
FIG. 9B is a front cross-sectional view in a state where the pen device is inserted through and held in the pen holder illustrated in FIG. 9A.

FIG. 9B is a front cross-sectional view in a state where the pen device 28 is inserted through and held in the pen holder 26 illustrated in FIG. 9A. When the pen holder 26 of the present embodiment holds the pen device 28, the pen device 28 is inserted into the inner periphery part 40e of the large loop 40c of the pen holding part 40 along the axial direction (refer to FIG. 3 and FIG. 4). In this regard, an internal diameter of the large loop 40c is less than an external diameter of the pen device 28. Thus, when the pen device 28 is inserted into the inner periphery part 40e, the pen holding part 40 is drawn to the chassis 30 side while expanding the diameter of the large loop 40c as illustrated in FIG. 9B. Thus, a root portion of the large loop 40c (neck portion between the large loop 40c and the small loop 40d) moves from the side surface opening 46b toward the top surface opening 46a of the cutout part 46.

In this way, when the pen device 28 is held by the large loop 40c, it moves upward while being drawn to the chassis 30 side. Thus, the large loop 40c holding the pen device 28 is abutted on or brought close to the bracket 42 and a gap G between the large loop 40c and the bracket 42 becomes almost zero (refer to FIG. 9B). As a result, the pen device 28 held by the pen holding part 40 looks as if it sucked at the side surface 30a of the chassis 30 and is in a stably held state without rattling (refer to FIG. 3 and FIG. 5). Further, the pen device 28 held by the pen holding part 40 has moved toward the top surface 30b side of the chassis 30. Thus, when the information device system 10 is used as a laptop PC as illustrated in FIG. 3, it is avoided that the pen device 28 held by the pen holding part 40 is abutted on a desk surface etc. on which the portable information device 11 is placed (refer to FIG. 4). As a result, it is prevented that the portable information device 11 generates rattling or strange noise when the keyboard 24 is typed on.

As illustrated in FIG. 9A and FIG. 9B, the stitched seam 40a and the pleat 40b of the pen holding part 40 are disposed not only in the inner periphery part 40e but also at a bottom portion 40f in the large loop 40c facing the bottom surface 30c side of the chassis 30. Thus, it is prevented that a turn-back portion (joint) of the fabric formed by the stitched seam 40a is exposed to the top surface 30b side, and the quality of appearance of the pen holder 26 is enhanced.

As described above, in the electronic device 13 of the present embodiment, the pen holder 26 is provided so as to project from the side surface 30a of the chassis 30 and can hold the pen device 28 in a posture along the side surface 30a. This pen holder 26 has the pen holding part 40 composed of stretchy fabric formed into a loop and having the inner periphery part 40e which the pen device 28 is inserted through and held in, the bracket 42 having the cutout part 46 in which a part of the pen holding part 40 is disposed, and fixed to the chassis 30, and the rod-like member 44 inserted through the inner periphery part 40e of the pen holding part 40, disposed in the cutout part 46, and connecting the pen holding part 40 to the bracket 42 by being fixed to the bracket 42 in a state of crossing the cutout part 46 in a width direction.

Therefore, according to the electronic device 13, the pen holder 26 can be easily attached to even the chassis 30 that has been made thinner, by connecting the pen holding part 40 in which stretchy fabric is formed into a loop to the chassis 30 using the bracket 42. At this time, the pen holding part 40 of the pen holder 26 is connected to the bracket 42 using the rod-like member 44. Thus, no screw hole etc. for fixing the pen holding part 40 is needed for the bracket 42 to be fixed to the thin chassis 30 and thus the thickness can be minimized. Furthermore, the looped pen holding part 40 is supported by the bracket 42 in a state of being hung on the rod-like member 44. Thus, as the pen holding part 40 holds the pen device 28, it moves smoothly to be drawn to the chassis 30 side and the gap G between the pen holding part 40 and the chassis 30 is reduced, as described above. As a result, while the pen holder 26 stably holds the pen device 28, high quality of appearance can be obtained. That is, if the pen holding part 40 is fixed to the bracket 42 with adhesive etc., a position of the root portion of the large loop 40c (neck portion between the large loop 40c and the small loop 40d) remains unchanged even when the pen device 28 is inserted. As a result, the large loop 40c of the pen holding part 40 and the pen device 28 swing at a position away from the chassis 30 and cannot be stably held, which reduces the quality of appearance.

It is a matter of course that the present invention is not limited to the embodiment described above and can be freely altered without deviating from the scope of the present invention.

For the electronic device 13 above, the keyboard device has been illustrated as an input device. However, the present invention can be preferably used for all electronic devices including an input device, such as a touch input device (pen tablet) larger than the touchpad 34, a touch panel type tablet PC or portable game console, etc.

For the chassis 30 above, a configuration including the top cover 36, the bottom cover 37, and the frame 38, has been illustrated. However, the chassis 30 may have a configuration of omitting the frame 38, and forming a vertical wall that forms the side surface 30a on the top cover 36 or the bottom cover 37, for example.

The invention claimed is:

1. An electronic device comprising:
    a chassis;
    an input device on a top surface of the chassis and configured to receive an input operation; and
    a pen holder that projects from a side surface of the chassis and is configured to hold a pen device along the side surface,
    wherein the pen holder has:
        a pen holding part composed of stretchy fabric configured in a larger loop and a smaller loop and whose respective openings extend parallel to one another, the larger loop being configured to hold the pen device in an inner periphery part thereof;
        a bracket having a cutout part in which a part of the pen holding part is disposed and which is fixed to the chassis; and
        a rod-like member that connects the pen holding part to the bracket, wherein the rod-like member extends through an inner periphery part of the smaller loop disposed in the cutout part and is fixed to the bracket, and extends across the cutout part of the bracket in a length-wise direction;
        a stitched seam that connects opposite ends of the stretchy fabric to form the larger and smaller loops.

2. The electronic device according to claim 1, wherein the chassis has:
    a top cover forming the top surface; and
    a bottom cover forming a bottom surface, and
    the bracket is fixed to the chassis and is held between the top cover and the bottom cover.

3. The electronic device according to claim 2, wherein a side surface of the bracket is a part of the side surface of the chassis.

4. The electronic device according to claim 2, wherein the cutout part has:
    a top surface opening on a top surface of the bracket; and
    a side surface opening extending from the top surface opening and is on the side surface of the bracket,
    the pen holding part is in the cutout part, and
    the top surface opening is covered by the top cover.

5. The electronic device according to claim 4, wherein a bottom surface of the bracket is a part of the bottom surface of the chassis.

6. The electronic device according to claim 1, wherein the pen holding part has:
    a pleat formed in front of the stitched seam, and
    the stitched seam and the pleat are disposed within the inner periphery part.

7. The electronic device according to claim 6, wherein the stitched seam and the pleat are disposed at a bottom portion in the larger loop formed by the stretchy fabric facing the bottom surface side of the chassis.

8. An information device system comprising:
    a main device to which a first chassis and a second chassis are adjacent to and are relatively rotatably connected to one another; and
    a plate-shaped sub-device configured for use with the main device, wherein the sub-device has:
  a chassis;
  an input device on a top surface of the chassis and configured to receive an input operation; and
  a pen holder that projects from a side surface of the chassis and is configured to hold a pen device along the side surface, the pen holder has:
  a pen holding part composed of stretchy fabric configured in a larger loop and a smaller loop and whose respective openings extend parallel to one another, the larger loop being configured to hold the pen device in an inner periphery part thereof;
  a bracket having a cutout part in which a part of the pen holding part is disposed and which isfixed to the chassis; and
  a rod-like member that connects the pen holding part to the bracket, wherein the rod-like member extends through an inner periphery part of the smaller loop disposed in the cutout part and is fixed to the bracket, and extends across the cutout part in a length-wise direction,
  a stitched seam that connects opposite ends of the stretchy fabric to form the larger and smaller loops;
when the information device system is in a stacked form in which the first chassis and the second chassis of the main device overlap with each other in their plane directions, the sub-device is disposed in a storage position where it is held between the first chassis and the second chassis, and
in the storage position, the pen holding part projects from side surfaces of the first chassis and the second chassis, and the pen device held by the pen holding part is contained within a stacking height of the first chassis and the second chassis.

\* \* \* \* \*